(12) United States Patent
Ramirez et al.

(10) Patent No.: US 12,443,691 B2
(45) Date of Patent: Oct. 14, 2025

(54) DETERMINATION OF DEVICES THAT ARE AVAILABLE FOR UNLOCK

(71) Applicant: DISH Wireless L.L.C., Littleton, CO (US)

(72) Inventors: James Ramirez, Littleton, CO (US); Christopher George, Lees Summit, MO (US)

(73) Assignee: DISH Wireless L.L.C., Littleton, CO (US)

( * ) Notice: Subject to any disclaimer, the term of this patent is extended or adjusted under 35 U.S.C. 154(b) by 218 days.

(21) Appl. No.: 18/145,666

(22) Filed: Dec. 22, 2022

(65) Prior Publication Data

US 2024/0211577 A1     Jun. 27, 2024

(51) Int. Cl.
*G06F 21/44* (2013.01)
*G06F 21/45* (2013.01)

(52) U.S. Cl.
CPC ............. *G06F 21/44* (2013.01); *G06F 21/45* (2013.01)

(58) Field of Classification Search
CPC ................................ G06F 21/44; G06F 21/45
See application file for complete search history.

(56) References Cited

U.S. PATENT DOCUMENTS

| | | | |
|---|---|---|---|
| 2011/0136471 A1* | 6/2011 | Chen ..................... | H04W 12/35 455/411 |
| 2014/0106753 A1* | 4/2014 | Narasimhan ...... | H04M 15/8033 455/436 |
| 2016/0094724 A1* | 3/2016 | Lemchak ................ | H04L 67/53 455/414.1 |
| 2017/0085546 A1* | 3/2017 | Velusamy ............. | H04W 12/35 |
| 2018/0309868 A1* | 10/2018 | Karimli ................. | G06F 21/629 |
| 2020/0351654 A1* | 11/2020 | Finger .................... | H04L 63/20 |
| 2022/0141653 A1* | 5/2022 | Garg ...................... | H04W 4/021 726/1 |

* cited by examiner

Primary Examiner — Jung W Kim
Assistant Examiner — Alan L Kong
(74) Attorney, Agent, or Firm — Kilpatrick Townsend & Stockton LLP

(57) ABSTRACT

A computer-implemented method is provided. In one example, the method includes: managing serialized inventory information regarding user devices according to a serialized inventory live status (SILS) data structure of the user devices, the serialized inventory information including first serialized inventory information regarding a first user device; obtaining a first state of the first user device, wherein the first state indicates whether the first user device is locked or unlocked with respect to a carrier service; determining if the first user device is eligible for unlock according to a set of pre-established rules specifying conditions for the first user device to be eligible for unlock; and transmitting an unlock command to the first user device, wherein the unlock command is executable to effectuate a change of the first user device from being locked to being unlocked with respect to the carrier service.

19 Claims, 6 Drawing Sheets

DETERMINATION OF DEVICES THAT ARE AVAILABLE FOR UNLOCK

BACKGROUND OF THE INVENTION

Mobile communication devices, such as smartphones, are often carrier-locked to a specific wireless communication carrier or network service provider. Since many wireless communication carriers provide a user with an initial subsidy and rely on a termed service contract to recoup the initial subsidy, these carriers commonly lock mobile communication devices to their cellular networks to prevent potential loss derived from fraudulent activities. Typically, these carriers may unlock mobile communication devices for eligible customers upon a user unlock request. For example, a wireless communication carrier may unlock a mobile communication device after a customer has completed the termed service contract. In order to distinguish between unlock requests of eligible customers and those of non-eligible customers, wireless communication carriers may use customer service representatives as gatekeepers. Upon receiving an unlock request from a customer for a mobile communication device, a customer service representative may initiate a review to ascertain whether the customer is eligible to have the mobile communication device unlocked. Following successful verification, the customer service representative may subsequently provide an unlock code to the customer for unlocking the mobile communication device. The customer then enters the unlock code into the mobile communication device at the appropriate user input interface to unlock the device.

The duration of such unlock eligibility verification may cause inconvenience to the customer and/or poor customer experience. Further, back-and-forth communications between the customer and the customer service representative may be overly burdensome, particularly for a partial unlock of a mobile communication device, such as unlocking the wireless communication for use with a foreign mobile carrier while traveling aboard. More importantly, many local administrative agencies currently prescribe regulatory rules that protect telecommunication customers and prohibit network carriers from unreasonably delaying carrier unlock for eligible devices in the absence of unlock requests.

BRIEF SUMMARY OF THE INVENTION

In some embodiments, a computer-implemented method for tracking and unlocking a user device is provided. In one example, the method includes: managing serialized inventory information regarding user devices according to a serialized inventory live status (SILS) data structure of the user devices, the serialized inventory information including first serialized inventory information regarding a first user device, and the serialized inventory live status data structure including a first instance for the first user device, the first instance including a field for a subscriber identity module (SIM) associated with the first user device; obtaining a first state of the first user device according to the first serialized inventory information regarding the first user device, wherein the first state indicates whether the first user device is locked or unlocked with respect to a carrier service; determining if the first user device is eligible for unlock according to a set of pre-established rules specifying conditions for the first user device to be eligible for unlock; and in response to the first state of first the user device indicates the first user device is locked with respect to a carrier service and the determination that the first user device is eligible for carrier unlock, transmitting an unlock command to the first user device, wherein the unlock command is executable to effectuate a change of the first user device from being locked to being unlocked with respect to the carrier service.

In some embodiments, a system for tracking and unlocking user devices is provided. In one example, the system includes: a serialized inventory management system (SIMS), a policy engine, an unlock engine, a communication interface, and at least one database. The SIMS further includes a serialized inventory live status (SILS) data processing module, a SILS data structure of the user devices, and an inventory item tracking module. The SIMS is configured to manage serialized inventory information regarding the user devices according to the SILS data structure of the user devices. The serialized inventory information includes first serialized inventory information regarding a first user device, the SILS data structure includes a first instance for the first user device, and the first instance includes a field for a subscriber identity module (SIM) associated with the first user device. The inventory item tracking module is configured to track the first user device and obtain a first state of the first user device according to the first serialized inventory information regarding the first user device, wherein the first state indicates whether the first user device is locked or unlocked with respect to a carrier service. The policy engine is configured to determine if the first user device is eligible for unlock according to a set of pre-established rules specifying conditions for the first user device to be eligible for unlock. The unlock engine is configured to transmit an unlock command to the first user device, wherein the unlock command is executable to effectuate a change of the first user device from being locked to being unlocked with respect to the carrier service, when the first state of first the user device indicates the first user device is locked with respect to a carrier service and the determination that the first user device is eligible for carrier unlock.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION OF THE INVENTION

Overview

Figure 1:
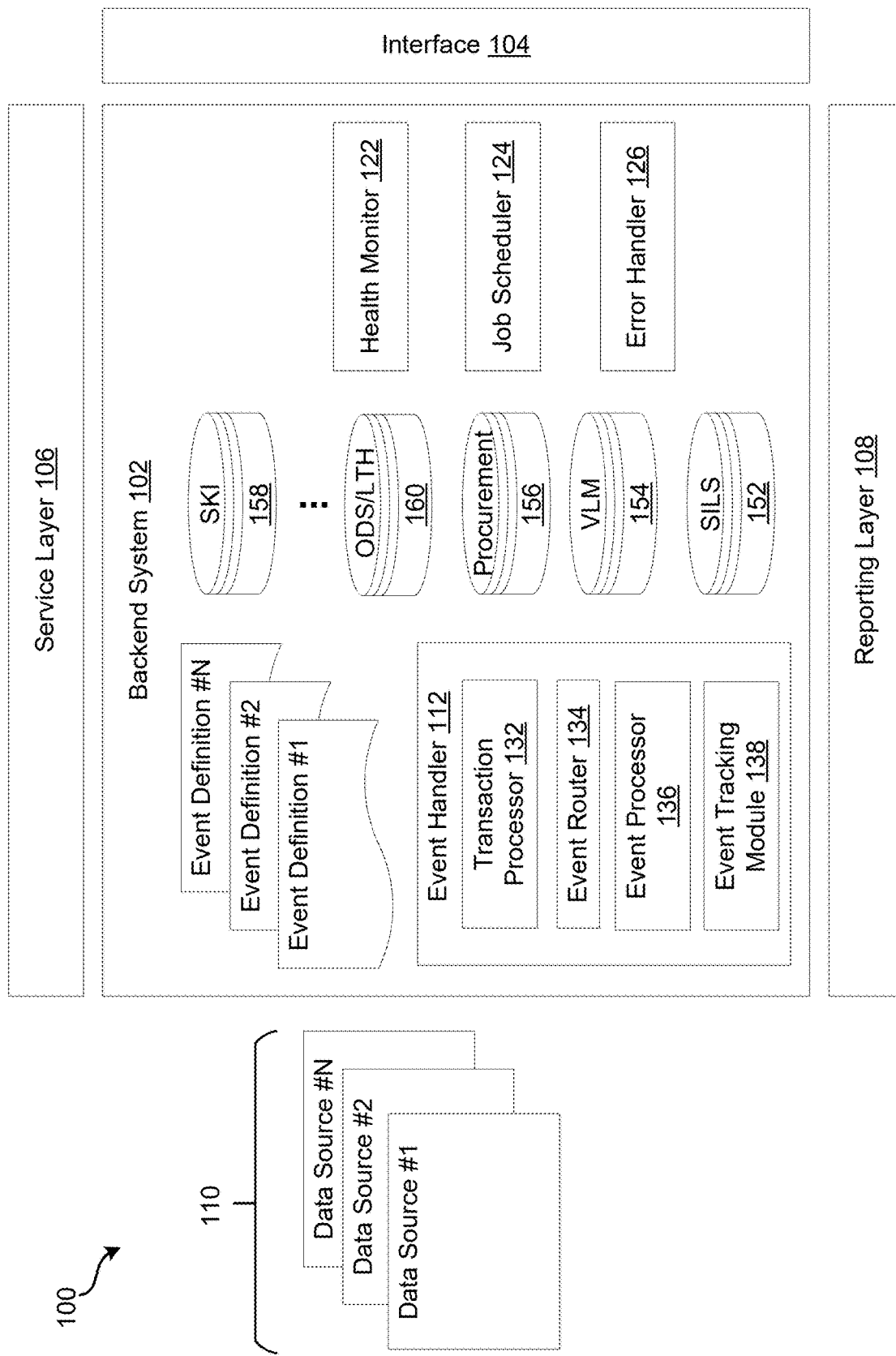
FIG. 1 is a schematic diagram illustrating an example system according to various embodiments.

This disclosure is directed to techniques for tracking user devices and providing a network/wireless unlock function that proactively determines eligibility of the user devices for unlock with respect to a specific carrier service or service provider. This disclosure is also directed to techniques for proactively and automatically unlocking user devices without the need to rely on unlock requests by users of the user devices.

The techniques provided in this disclosure advantageously use a combination of an inventory management system and a device tracking and unlocking system (DTUS) to perform the network/wireless unlock function. The inventory management system is employed to generate and manage serialized inventory information regarding a particular inventory item (e.g., a user device) before it is released from an inventory and distributed to a user. In addition, a device tracking and unlocking system (DTUS) may be employed to proactively and automatically track the user device and obtain a live status or state of the user device. The live status of the user device may indicate whether the user device is locked or unlocked to a specific carrier service. The live status of the user device may be further processed to determine unlock eligibility according to pre-established rules specifying conditions for device unlock. A serialized inventory live status (SILS) data structure may be employed to facilitate determination of the live status of the user device and the unlock eligibility regarding the user device. The network/wireless unlock function may unlock a user device from exclusive use on a network of a wireless communication carrier. The provided techniques may also allow for a batch process to simultaneously tracking and unlocking multiple user devices.

A user device may be carrier locked to a wireless communication carrier via a subscriber identity module (SIM) lock engine that is operably connected to the user device or an embedded SIM lock (eSIM) engine integrated to the user device. A device carrier code may be permanently embedded in the user device at the time that the user device is manufactured. When a user subsequently signs for service with a wireless communication carrier, a SIM or eSIM that provides access to the network of the mobile communication carrier may be installed on the user device. At each boot time of the user device for use, the SIM/eSIM lock engine of the user device may perform a carrier verification check. The carrier verification check may compare the embedded carrier code against a carrier code that is stored in the SIM/eSIM. Thus, if the SIM/eSIM lock engine determines that the device carrier code matches the SIM/eSIM carrier code, the SIM lock engine may permit the user device to initiate a normal boot up without limitation to exclusive network service. Otherwise, the user device is permitted by the SIM lock engine to boot into a limited functionality mode or exclusive use of a specific network provided by a wireless communication carrier.

In various embodiments, the network/wireless unlock function provided in this disclosure may unlock a user device from a network of a wireless communication carrier in a proactive and automatic way. In some embodiments, an inquiry regarding a live status of the user device is wirelessly transmitted to the user device. In response, a status profile containing status information regarding the live status of the user device is received by the wireless communication carrier. The information regarding the live status of the user device may be further analyzed and processed by a policy engine. The policy engine may perform an unlock eligibility verification according to a pre-established policy or a set of pre-established rules that set forth the conditions needed to be satisfied for unlocking. Upon verifying that the user device is eligibility for the unlock, the policy engine may transmit an unlock command to the user device. The unlock command may include an instruction for a device unlock application of the user device to automatically unlock the user device. In some embodiments, the unlock command may disable the user device from performing the carrier verification check at each boot time of the user device. In some embodiments, the transmission of the status inquiry and the unlock command for a user device may be performed using integrity-protected communication.

The techniques provided in this disclosure may provide a fully automated unlock that results in increased convenience for a user of a user device. Instead of waiting for as long as multiple days for a customer service representative to fulfill an unlock request, a user device may be unlocked in a shorter amount of time, e.g., in as short as a few seconds. Further, the techniques advantageously allow a wireless communication carrier to proactively and automatically unlock the user device by tracking the user device in an efficient and reliable manner. Importantly, the wireless communication carrier need not to wait until an unlock request is submitted by the user of the device. As a result, the risk for delayed unlock service and violation of local regulation rules on customer protection may be reduced or eliminated. The techniques described herein may be implemented in a number of ways. Example implementations are provided below with reference to the following figures.

Example System, Architecture, Data Structure and Method

FIG. 1 is a schematic diagram illustrating an example system 100 configured to facilitate providing a network unlock function in accordance with one embodiment. In that embodiment, the system 100 is configured to manage a supply chain for a service/product provider, manage an inventory of products, establish and maintain a serialized inventory database for inventory items, track an inventory item (e.g., a user device), determine a live status of the user device, determine eligibility of a device for unlocking, and unlock a user device in accordance with the present disclosure.

In the illustrated example of FIG. 1, the system 100 includes, among other components, a backend system 102, an interface 104, a service layer 106, a reporting layer 108, and data sources 110. In various implementations, the system 100 may include one or more electronic processors configured to implement various functions provided the components of system 100, such as those shown in FIGS. 2-7. It should be understood, the system 100 is not limited by its constituent components shown in this example. That is, it is not intended to limit the system 100 to one single computer device or more than one computer device. In accordance with the present disclosure, system 100 can be implemented by one or more computer device.

As shown in FIG. 1, the backend system 102 includes, among other components, an event handler 112, multiple databases, a health monitor module 122, a job scheduler 124, and an error handler 126. The multiple databases may include a serialized inventory live status (SILS) database 152, a virtual location management (VLM) database 154, a procurement database 156, a stock keeping unit information (SKI) database 158, an event history (transaction history) database 160. Other databases may also be included in the backend system 102. In addition, the databases included in the backend system 102 may be consolidated or integrated or otherwise share the same database platform.

The event handler 112 is configured to handle individual events received/generated by the backend system 102. A given individual event can indicate a creation/modification/ retrieval of one or more data records managed by the backend system. In this example, the event handler 112 includes, among other components, a transaction processor 132, an event router 134, an event processor 136, and an event tracking module 138.

In this example, the transaction processor 132 is configured to process a transaction received as indicated by an event received by the event handler 112. For instance, a manual transaction of a new device activation may be entered through the interface 104, which, in turn, generate an event of recording the device activation. This event is intercepted by the event handler 112 and a transaction of the new device is activation can be recorded in procurement database 156 through the transaction processor 132. In another example, a request for device unlocking is entered through the interface 104, which in turn, generates an event of device unlocking upon eligibility verification. In yet another example, a live status of a user device in response to an inquiry made by the system 100 may be entered through the interface 104, which, in turn, generate an event of device unlock upon eligibility verification.

In this example, the event router 134 is configured to route an event received by the event handler 112 to an appropriate sub-module of the event handler 112 based on one or more definitions of the events. For instance, the event of the new device activation is routed to the event processor 136 for further processing, and an event of device tracking request is routed to the event track module 138 for further processing. As shown, individual definitions of the events can be stored in the backend system 102. A given definition of a particular event can specify one or more actions to be taken upon receiving this event by the event handler 112.

In this example, the event processor 136 is configured to process an event received by the event handler 112. For instance, the new device activation event request can be received by the event processor 136, which, in turn, is configured to instruct the transaction processor 132 to create a record in the procurement database 156 as a result of the new device activation event received by the event handler 112.

The event tracking module 138 is configured to track one or more events received by the event handler 112. For example, the events received by the event handler 112 can include an event inquiring a live status of a particular user device. After receiving this event, the event router 134 routes the event to the event tracking module 138, which, in turn, generates an inquiry into the SILS database 152 for a status for the particular device. In one example, eligibility of the user device for unlocking is determined by comparing the live status of the user device and the information of the user device stored in the SILS database 152 according to an existing device unlock policy. If the user device is determined to be eligible for unlock, the event processor 136 may send an unlock command to the user device to unlock the user device from exclusive use on a network of a wireless communication carrier.

As can be seen, in this example, the backend system 102 includes various databases including a SILS database, a virtual location management (VLM) database 154, a procurement database 156, a SKI database 158, an ODS/LTH database 160, and/or any other databases. In this example, the SILS database is configured with SILS data structures in accordance with the disclosure. The SILS database thus is enabled to persist SIM/eSIM profiles and attributes available for individual user devices in the backend system 102.

Figure 2:
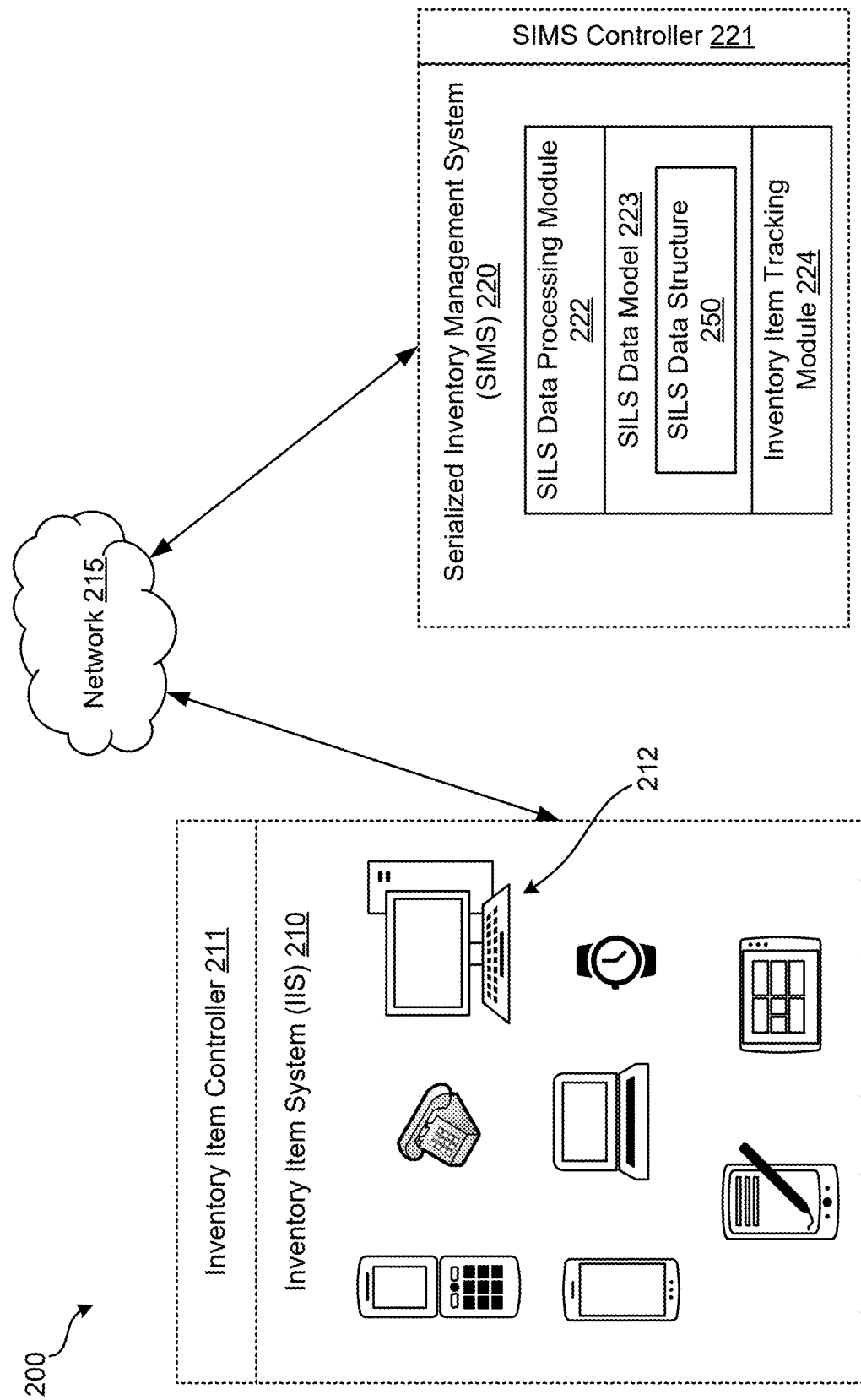
FIG. 2 is a schematic diagram illustrating an example of a communications system according to various embodiments.

FIG. 2 is a schematic diagram illustrating an exemplary communications system 200 for tracking an item of inventory using SILS data structures in accordance with another embodiment. For brevity, several elements in FIG. 2 are represented as monolithic structures. It is to be understood, however, that each structure may include numerous interconnected computing elements and/or components designed to operate according to aspects of the present disclosure.

As shown in FIG. 2, the system 200 includes an inventory system 210 connected through a network 215 to a serialized inventory management system (SIMS) 220. The inventory system 210 and the SIMS 220 are configured to communicate and exchange information through the network 215. The SIMS 220 may include and/or form part of an information delivery network, such as, for example, the Internet, the World Wide Web (Web), an online service provider, a private network, and/or any other analog or digital wired and/or wireless network that provides information.

In general, the inventory system 210 includes an inventory item 212 having hardware and/or software components for communicating with the network 215 and the SIMS 220. The inventory system 210 and SIMS 220 each may include one or more computers systems and may be structured and arranged to communicate using various communication protocols to establish connections between network elements and/or to operate within or in concert with one or more other systems (e.g., the Internet and/or Web).

In some embodiments, the inventory system 210 and the SIMS 220 each include one or more devices operating under the command of a controller (e.g., inventory item controller 211, and the SIMS controller 221). The broken lines are intended to indicate that in some implementations, the controller, or portions thereof considered collectively, may instruct one or more elements of the systems to operate as described. Accordingly, the functions described herein may be implemented as software controlling one or more elements of the inventory system 210 and/or the SIMS 220.

In some embodiments, the inventory item 212 is a subscriber device (sometimes also referred to as "user device"). An example of a subscriber device is a general-purpose computing device capable of responding to and executing instructions in a defined manner. Other examples of a subscriber device include a special-purpose computer, a personal computer (PC), a workstation, a server, a laptop computer, a web-enabled telephone, a web-enabled personal digital assistant (PDA), a web-enabled personal computing device, a web-enabled smartphone, etc.

An example of a controller (e.g., the inventory item controller 211 or the SIMS controller 221) is a program or software application installed on one or more devices. Other examples include codes, instruction sets, signals, or some combination thereof, for independently or collectively providing instructions. The controller may be implemented utilizing any suitable computer language and/or object-oriented techniques. The controller also may be embodied permanently or temporarily in any type of device, component, physical or virtual equipment, storage medium, or propagated signal capable of delivering instructions. In some embodiments, the controller (e.g., computer program, software application) may be stored on a storage medium (e.g., disk, device, propagated signal), such that if the storage medium is read by a computer system, the functions described herein are performed. In some embodiments, the inventory item 212 is a user, and the controller 211 includes an eUICC or eSIM embedded into or integrated with the user. In some embodiments, the controller 211 includes a UICC or a SIM card (in a physical form factor) operably and removably attached to the user device. In some embodiments, the controller 211 includes both a SIM and an eSIM.

In some embodiments, the inventory item 212 is a smartphone (e.g., a smartphone under the brand name of iPhone®, iPad®, and Samsung Galaxy®, etc.). The corresponding inventory item controller 211 includes at least one SIM card programmed to communicate a live status of the smartphone with the SIMS controller 221.

As shown in FIG. 2, the SIMS 220 includes, among other components, a serialized inventory live status (SILS) data processing module 222, a SILS data model 223, and an inventory item tracking module 224. It is noted that additional sub-systems, modules, and databases may be included in the SIMS 220 on demand. Typically, the components of the SIMS 220 may employ a common database platform with business logic residing in the appropriate modules. In general, the modules may be implemented as hardware and/or software for performing the prescribed operations. It is to be understood that while certain components of the SIMS 220 are shown as monolithic structures, each may include numerous elements (e.g., servers, routers, switches, firewalls, sockets, databases, tables, disks, hard drives, etc.) in various embodiments.

In some embodiments, the SILS data processing module 222 is configured to receive, record, analyze, and process serialized inventory information for each inventory item or a group of common inventory items. The serialized inventory information may be obtained from a data source and may indicate a live status of the inventory item. In some embodiments, the SILS data processing module 222 may detect a change of the live status for the inventory item and convert the change into an event, according to a predetermined event definition.

Examples of serialized inventory information include, but are not limited to: an electronic serial number (ESN), an international mobile equipment identification (IMEI), a mobile identification number (MIN), an unlocking code for the handset, a subscriber information module (SIM) card code, an embedded SIM (eSIM) card code, a SIM card profile, an eSIM card profile, a universal integrated circuit card (UICC) code, an embedded UICC (eUICC) code, a UICC profile, an eUICC profile, a serial number of a finished handset assembly, a serial number of a basic component (e.g., speakers, microphones, keypads, displays, ringers, processors, chipsets, memories, displays, batteries) or an add-on component (e.g., communication devices, cameras, location technologies, multimedia players) of a finished handset.

In some embodiments, the SILS data processing module 222 is configured to generate a data field (sometimes also referred to as "data entry" or "data attribute" or "attribute") and assign the serialized inventory information to the data field with respect to each inventory item. In some embodiments, the SILS data processing module 222 is further configured to group data fields associated with a particular inventory item or a particular group of common inventory items.

The SILS data model 223 is configured to store the serialized inventory information received and processed by the SILS data processing module 222. In some embodiments, the SILS data model 223 includes at least one SILS data structure 250. The SILS data structure 250 includes an instance corresponding to an inventory item 212 (e.g., a user device 306 shown in FIG. 3). The instance includes serialized inventory information associated with the corresponding inventory item. Details of the SILS data structure will be described below with reference to FIGS. 4-6.

The inventory item tracking module 224 is configured to track the inventory item 212 and obtain a live status of the inventory item 212 according to the serialized inventory information associated with the inventory item 212. The inventory item tracking module 224 can receive information regarding the inventory item 212 through the communication between the inventory item controller 211 and the SIMS controller 221, as mentioned above. The inventory item tracking module 224 can further determine a live status of the inventory item 212 based on the received information, update the SILS data model 223 with the status formation of the inventory item 212, and transmit the received information to other systems (e.g., a resource planning system (EPR)) for further analysis. In some embodiments, the SIMS 220 may communicate information regarding the live status of the inventory item 212 to manufacturers, distributors, carriers, customers, operations, and other company areas and partners.

In some embodiments, the system 200 may further include a resource planning system (not shown) and an order fulfillment system (not shown) that are operably connected to the SIMS 220. The resource planning system (EPR) may be configured to cover inventory quantity and cost information, while maintaining serialized inventory information of the tracked inventory item 212. The order fulfillment system may be configured to incorporate rules and manage the operational steps of order fulfillment.

Figure 3:
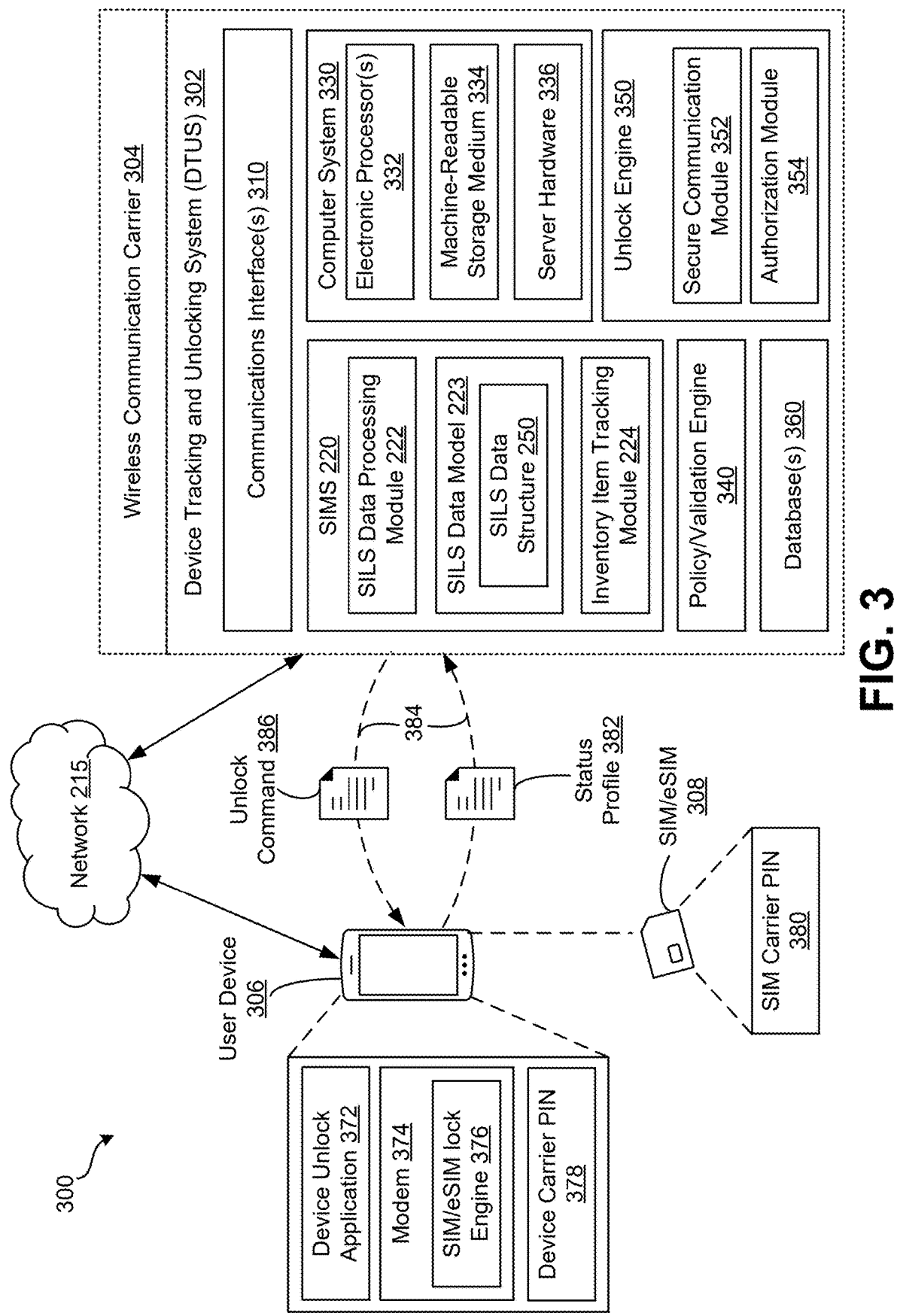
FIG. 3 is a schematic diagram illustrating an example architecture according to various embodiments.

FIG. 3 is a schematic diagram illustrating an exemplary architecture 300 for implementing carrier unlock of user devices in accordance with another embodiment. The architecture 300 can be used for tracking a user device of an inventory, determining a live status of the user device, determining eligibility of the user device for unlock, and unlocking the user device. It is to be understood, however, that each structure may include numerous interconnected computing elements and/or components designed to operate according to aspects of the present disclosure.

As shown in FIG. 3, the architecture 300 includes a device tracking and unlocking system (DTUS) 302 wirelessly connected to a user device 306 through a network 215 provided by a wireless communication carrier 304. The user device 306 is an inventory item derived from a user device inventory. The user device inventory may include multiple user devices that are each wirelessly connected to the DTUS 302. The user device 306 may have been released from the user device inventory and is currently used by a user. The user device inventory may be owned and operated by the wireless communication carrier 304 or a third-party provider. The DTUS 302 may be owned and operated by the wireless communication carrier 304. The DTUS 302 and the user device 306 are configured to transmit wireless signals to each other, communicate, and exchange information through the network 215.

The wireless communication carrier 304 may provide and operate the wireless network 215. The wireless network 215 may include base stations and a core network. The base stations may be a part of the access network structure of the wireless network 215. The base stations are responsible for handling voice, data, information, message, and information traffic between user devices, such as the user device 306 and the core network. Alternatively, the user device 306 may access the core network via other communication networks of the wireless communication carrier 304 and/or third-party providers that connect to the core network. The core network may provide telecommunication and data communication services to the user devices. For example, the core network may connect the user device 306 to other telecommunication and data communication networks.

The user device 306 may be a subscriber device as described above, e.g., a smartphone, a tablet computer, or any other device that is capable of using a SIM and/or an eSIM (collectively as SIM/eSIM 308), to obtain telecommunication and/or data communication services from the wireless communication carrier 304. The user device 306 may include a device unlock application 372 and a modem 374. The modem 374 may include a hardware component that enables the user device 306 to perform telecommunication and data communication with the wireless network 215. The modem 374 may include a SIM/eSIM lock engine 376. The SIM/eSIM lock engine 376 is able to access a device carrier PIN 378 that is embedded in the user device 306 when the device is manufactured. Furthermore, the SIM/eSIM lock engine 376 is also able to access a SIM/eSIM carrier PIN 280 that is stored in a SIM/eSIM 308.

At each boot time of the user device 306, the SIM/eSIM lock engine 376 may perform a carrier lock verification of the device carrier PIN 378 against the SIM carrier PIN 380. Accordingly, if the SIM/eSIM lock engine 376 determines that the device carrier PIN 378 matches the SIM carrier PIN 380, the SIM/eSIM lock engine 376 may permit the user device 306 to initiate a normal boot up, and the user device 306 is accordingly unlocked from the exclusive use on the network 215 or an exclusive network provided by the wireless communication carrier 3204. Otherwise, the user device 306 is permitted by the SIM/eSIM lock engine 376 to boot into a limited functionality mode on an exclusive network provided by the wireless communication carrier 304. For example, the limited functionality mode may at best allow the user device place emergency service calls using the exclusive network of the wireless communication carrier 304.

The DTUS 302 may include, among other things, a communications interface 310, a serialized inventory management system (SIMS) 220 as described above, a computer system 330, a policy engine 340 (also referred to as a "validation engine"), an unlock engine 350, one or more databases 360. In various embodiments, the wireless communication carrier 304 may use the inventory item tracking module 224 of the SIMS 220 to track the user device 306 and transmit a status inquiry regarding a live status of the user device 306 and/or the SIM/eSIM 308 associated with the user device 306. The live status inquired by the SIMS 220 may seek status information related to a live status indicating whether the user device 306 is locked or unlocked. Examples of status information include but are not limited to the purchase date of the user device, the activation date of the user device 306, the activation date the SIM/eSIM 308, total time on service provided by the carrier, etc.

Upon receiving the status inquiry transmitted from the DTUS, the device unlock application 372 of the user device 306 in response may use the integrity-protected communication 384 to transmit a status profile 382 back to the DTUS 302. The status profile 382 may be received by the SILS data processing module 222. The status profile 382 may include various information related to the user and the user device 306. The information of the status profile 382 may be analyzed and processed by the SILS data processing module 222 to obtain additional live statuses regarding the user device 306.

The live status of the user device 306 may be further transmitted to and received by the policy engine 340. The policy engine 340 may perform an unlock eligibility verification based on the live status of the user device 306. In some embodiments, the unlock eligibility verification may be performed according to an existing policy or a set of pre-established rules that specify the conditions for carrier unlock. Upon satisfaction of the specified conditions, the user device is eligible for carrier unlock. In some embodiments, the policy engine 340 may use the SILS data structure 250 for the user device 306 to verify the unlock eligibility. As mentioned above, the SILS data structure 250 may contain serialized inventory information regarding the user device 306 before it is released out of the inventory. The serialized inventory information regarding the user device 306 may be used as a reference and compared against the status information of the status profile 382 sent from the user in response to the status inquiry. Based on the comparison and the existing policy for unlock, the policy engine 340 may determine and verify unlock eligibility for the user device.

Upon verifying that the user device 306 is eligibility for unlock, the unlock engine 350 may generate an unlock command 386 and transmit it to the user device 306 via integrity-protected communication 384. In some embodiments, the unlock engine 350 may include a secure communication module 352 and an authorization module 354. The secure communication module 352 may be responsible for establishing integrity-protected communication 384 with user device 306. The secure communication module 352 may also have the ability to request verification of a trusted key as belong to a particular user device from a trusted third-party authentication authority. Additionally, the secure communication module 352 may perform an integrity validation of the status profile 382 sent from the user device, by comparing the identification of the user device from the status profile 382 with the recorded identification in the SILS data structure and detecting the presence or absence of a mismatch.

The authorization module 354 may give authorization to the generation, issuance, and transmission of the unlock command 386 to the user device upon validation by the policy engine 340. The authorization module 354 may further check if the unlock command 386 is correctly issued and handle errors of the unlock command 386. The databases 360 may include a subscriber account database that holds payment information, a user device status database, a subscriber information database, a rule database containing the pre-established rules specifying conditions for carrier unlock, etc. Information from the databases 360 is retrievable for the unlock eligibility verification. The authorization module 354 may use the communication interface 310 to send unlock commands to the user device 306.

Upon receiving the unlock command 386, the device unlock application 372 of the user device 306 may perform validation of the unlock command 386 by independently computing a verification message digest of the unlock command 386 using a device key. The device unlock application 372 may then compare the verification message digest to an appended message digest that is extracted from the unlock command 386. Thus, the device unlock application 372 may determine that the unlock command 386 is valid if the message digest from the unlock command 128 and the verification message digest match. Otherwise, the unlock command 386 is deemed to be invalid. Upon validation, the device unlock application 372 may extract the instruction from the unlock command 386.

If the unlock command 386 is validated by the device unlock application 372, the SIM/eSIM lock engine 376 may process the unlock information in the instruction. The unlock information may indicate the permanency of the unlock (i.e., temporary vs. permanent), a geographical region of the unlock, a unique identifier of the unlock command 386, the identity (e.g., session identifier) of the unlock command 386, the time and date that the unlock command is generated, and/or so forth. The SIM/eSIM lock engine 376 may use the identification information to prevent unauthorized replay of an unlock command. In instances in which the unlock is temporary, the unlock information may indicate the duration of the temporary unlock, a start date and time for the temporary unlock, and/or an end date and time of the temporary unlock. On the other hand, if the unlock command 386 is not validated by the device unlock application 372, an error message will be generated and transmitted back to the DTUS 302, indicating that the device unlock is unsuccessful.

The integrity-protected communication 384 may be implemented using unique device and application keys that are assigned to a user device 306 prior to the distribution of the device for use by a consumer. The device and application keys may include corresponding public and private keys. The unlock command 386 may disable the SIM/eSIM lock engine 376 from performing the carrier verification check at each boot time of the user device. As a result, the user device 306 will subsequently boot up and use an available network of a compatible wireless communication carrier regardless of the carrier code of the compatible wireless communication carrier. In some embodiments, the integrity-protected communication 384 may be exchanged between the user device 306 and the DTUS 302 via the wireless network 215, a mobile hotspot operated by the wireless communication carrier 304, a third-party data communication network, or any combination thereof.

The computer system 330 may include one or more electronic processors 332, machine-readable storage medium (memory) 334, and server hardware 336. The electronic processors 332 and the memory 334 may implement the SIMS 220, the policy engine 340, the unlock engine 350. The computer system may further include an operating system (not shown). The operating system may include components that enable the DTUS 302 to receive and transmit data via various interfaces (e.g., user controls, communication interface, and/or memory input/output devices), as well as process data using the electronic processors 332 to generate output. The operating system may include a presentation component that presents the output (e.g., display the data on an electronic display, store the data in memory, transmit the data to another electronic device, etc.). Additionally, the operating system may include other components that perform various additional functions generally associated with an operating system. The server hardware 336 may include additional hardware that performs user interface, data display, data communication, data storage, and/or other server functions.

Figure 4:
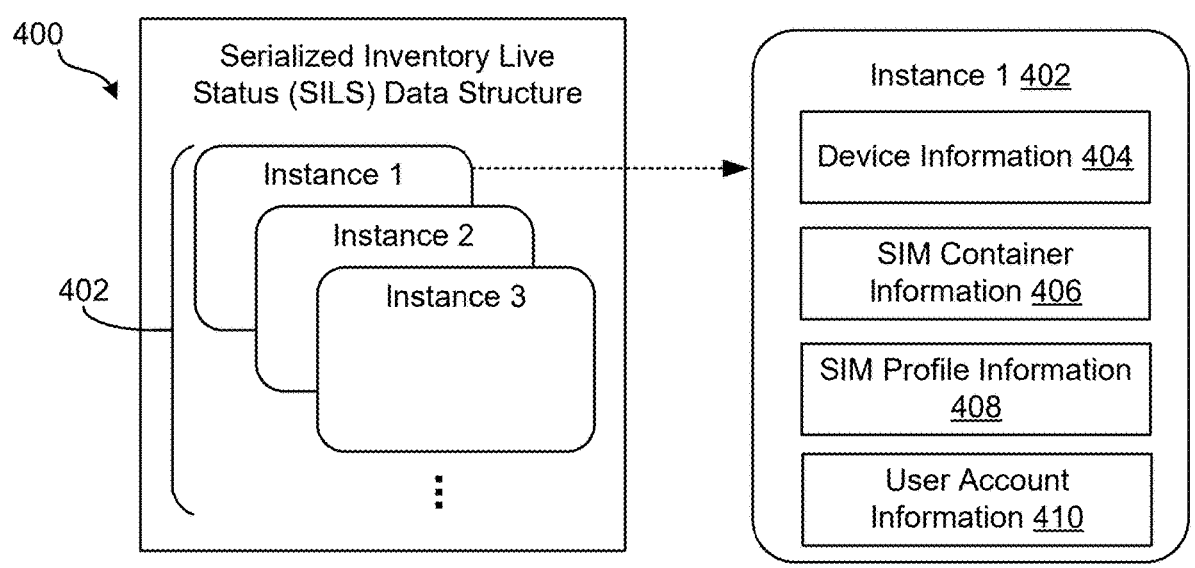
FIG. 4 is a schematic diagram illustrating an example of SILS data structure according to various embodiments.
Figure 5:
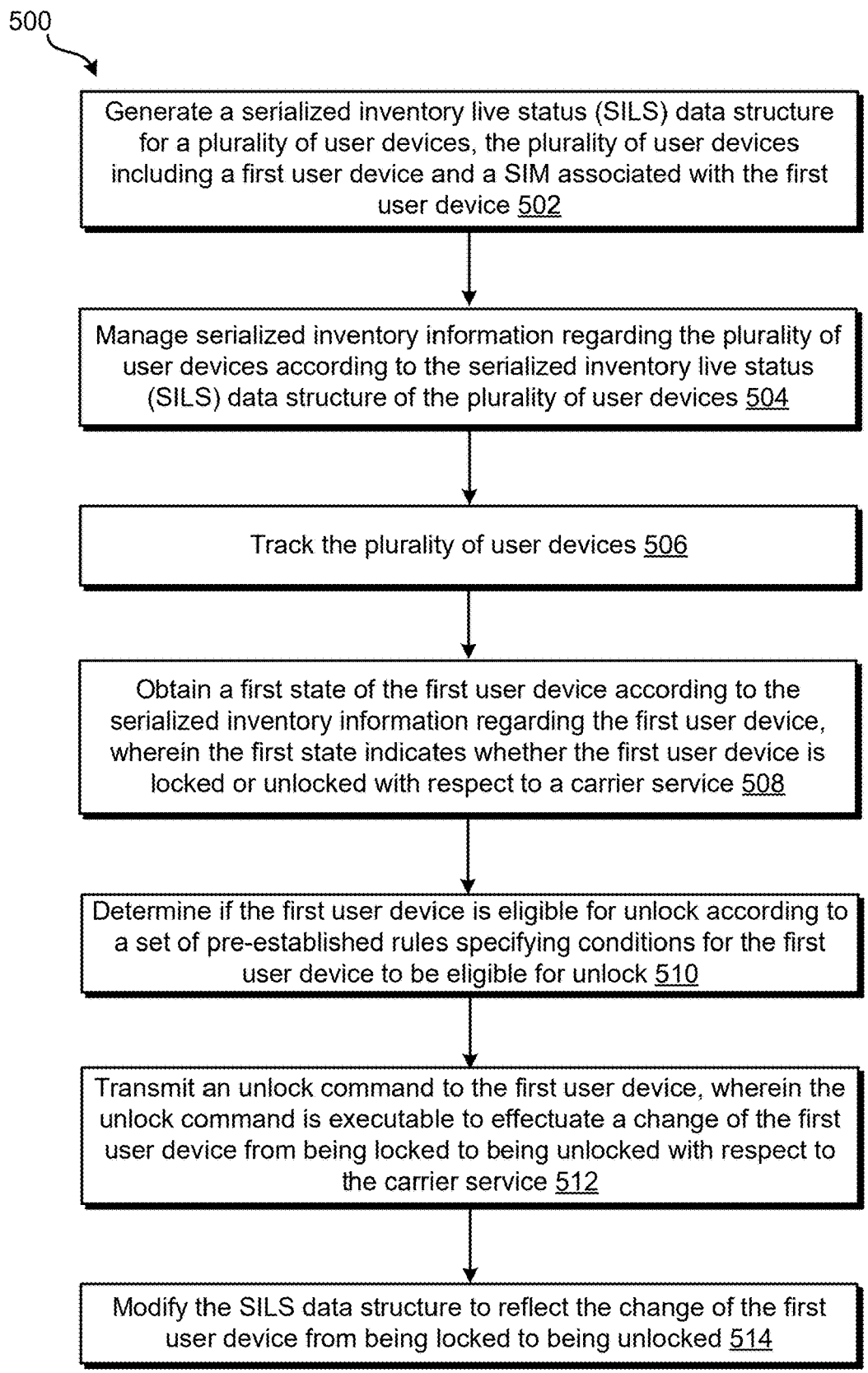
FIG. 5 is a flowchart diagram illustrating an example method according to various embodiments.
Figure 6:
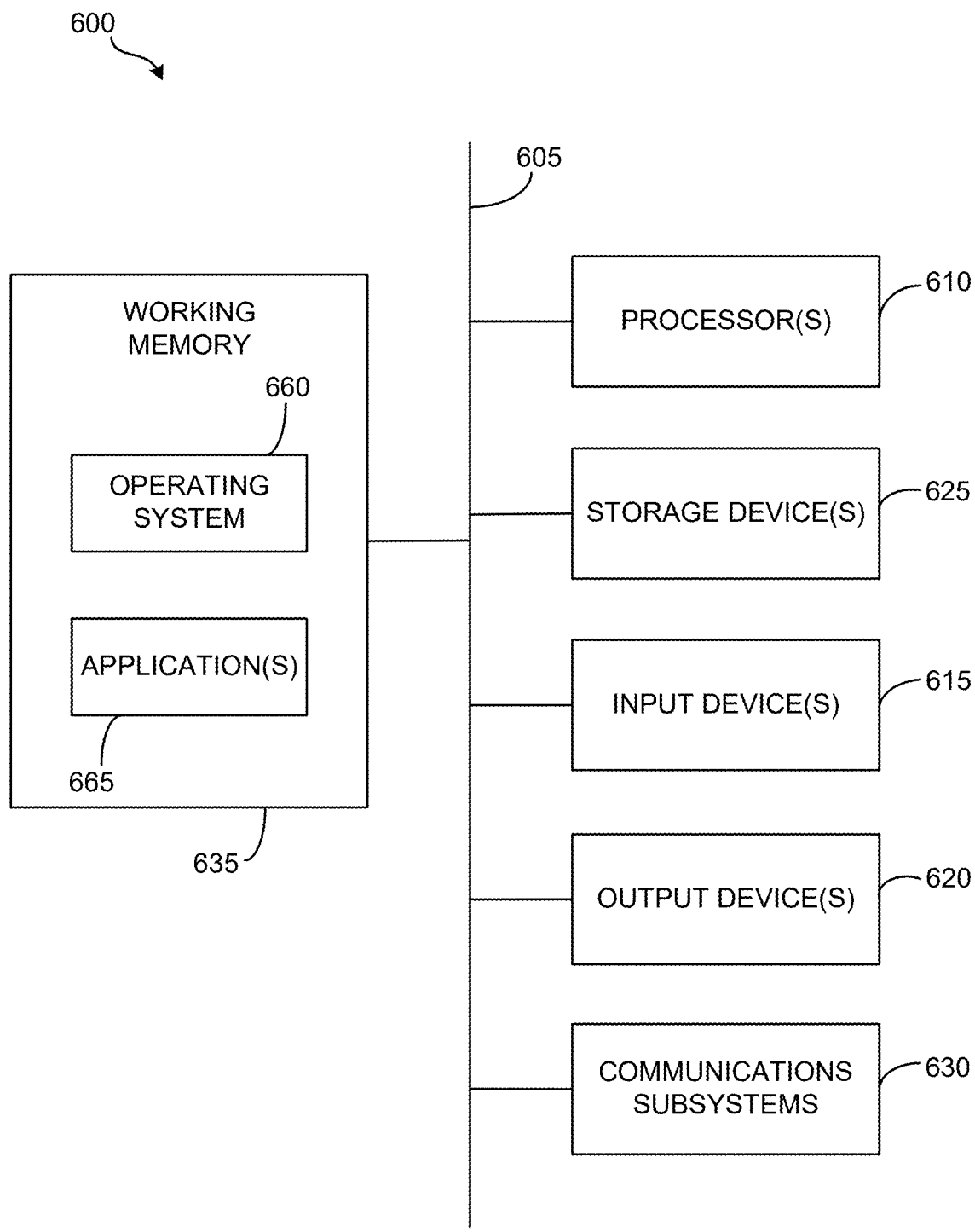
FIG. 6 is a schematic diagram illustrating an example of a computer system according to various embodiments.

FIGS. 4-6 are schematic diagrams illustrating examples of the SILS data structure according to various embodiments. As mentioned above, the SILS data structure described herein includes serialized inventory information regarding a user device and SIM/eSIM associated with the user device before and after the user device is released from the inventory.

As shown in FIG. 4, the SILS data structure 400 includes a plurality of instances 402, e.g., a first instance (instance 1), a second instance (instance 2), a third instance (instance 3), and so on. Each instance corresponds to a specific user device. Each user device may have a SIM/eSIM associated with the corresponding user device. As an example, the first instance corresponds to a first user device and includes first serialized inventory information regarding the first user device and a SIM/eSIM associated with the first user device. The first instance 402 further includes various information related to the first user device, including device information 404, SIM/eSIM container information 406, SIM/eSIM profile information 408, and user account information. Each instance may include at least one data field (sometimes also referred to as "field") related to one or more attributes of the user device.

In some embodiments, the device information 404 contains general information about the user device such as product/manufacturing information and a serial number of the user device. In some embodiments, the device information 404 contains an IMEI number associated with the user device. The SIM container information 406 contains a UICC/eUICC number and general information regarding the UICC or the eUICC that is embedded in the user device. The UICC functions as a SIM container and contains a SIM that is compatible with and operably connectable to the user device. The eUICC functions as an eSIM container and contains one or more eSIMs embedded in the user device. The SIM/eSIM profile information 408 may have at least one SIM/eSIM profile. In some embodiments, more than one SIM/eSIMs are associated with the user device, and thus the SIM/eSIM profile information 408 may have multiple SIM/eSIM profiles, each corresponding to a particular SIM or eSIM.

In some embodiments, the device information 404 includes multiple data fields, e.g., data field 1, data field 2, . . . , data field N. In some embodiments, the data fields of the device information profile 612 include at least one of: a data field containing a SKU number, which relates to various information about the user device; a data field containing disposition code information about the current disposition of the user device through its lifecycle; a data field containing additional information regarding the latest update to disposition code; a data field containing information regarding the brand of the user device and legal values to be determined or enforced by upstream services; a data field containing information of the time point of sale associated with the user device; and a data field containing information identifying the person or entity who currently owns or uses the user device.

In some embodiments, the device information 404 may additionally include at least one of: a data field containing information regarding the most recent date/time on which the user device was sold; a data field containing information regarding the most recent date/time on which the user device was returned; name or code of the manufacturer of the user device; a data field containing information regarding the date on which the user device was manufactured (if known); a data field containing information regarding the original cost for the user device when acquired; and a data field containing information regarding the current monetary value of the user device.

In some embodiments, the first instance 402 further includes at least one data field containing device identity information in relation to the SIM/eSIM associated with the user device, including but not limited to: a data field containing the manufacturer-assigned unique serial number for the device; a data field containing the manufacturer's part number for the device; a data field containing a first IMEI (denoted as IMEI-1) number assigned to a first radio chip installed in the device; a data field containing information about the SIM type related to the IMEI-1; a data field containing information about the current status of the carrier lock/unlock with respect to the SIM associated with IMEI-1; a data field containing a second IMEI (denoted as IMEI-2) number assigned to a first radio chip installed in the device;

a data field containing information about the SIM type related to the IMEI-2; a data field containing information about the current status of carrier lock/unlock the device with respect to each eSIM associated with IMEI-2.

In some embodiments, the first instance 402 further includes at least one of: a data field containing information about the date on which the device may be eligible to be unlocked with respect to each SIM and eSIM; a data field containing information about a future date to perform a temporary unlock (seasonal unlock) of the device with respect to each SIM and eSIM; a data field containing information about a future date to lock the device (closing a seasonal unlock window) with respect to each SIM and eSIM; a data field containing message(s) to convey any immediate error codes or success message feedback to the user of the device with respect to each SIM and eSIM; and a data field containing an unlock PIN code (encrypted); and so on.

In some embodiment, the SIM/eSIM container information 406 includes at least one of: a data field containing the Integrated Circuit Card Identifier (ICCID) number, which is the identifier of the UICC hardware; a data field containing information regarding the installation status of the UICC (SIM card); a data field containing information regarding the manner the SIM card can be triggered for changes (by network carrier or by the user); a data field containing the Embedded Integrated Circuit Card Identifier (EID) number, which is the identifier of the eUICC; a data field containing information regarding the installation status of the eUICC and each eSIM associated therewith; a data field containing information regarding the manner the eSIM can be triggered for changes (by network carrier or by the user).

In some embodiments, the SIM/eSIM profile information 408 includes at least one of: a data field containing information regarding the profile type (e.g., identity of the profile by the carrier, SIM/eSIM vendor providing the SIM/eSIM profile, version of the profile, etc.); a data field containing information regarding the state of the SIM/eSIM profile (e.g., whether the profile is allocated, linked, downloaded, and installed); a data field containing information regarding a Personal Identification Number (PIN) assigned to the SIM card; a data field containing information regarding a second Personal Identification Number (PIN) assigned to the SIM card, if any; a data field containing a status of the first and/or second PIN; a data field containing information regarding a International Mobile Subscriber Identity (IMSI) assigned to the user of the device; and a data field containing information regarding the unique identifier in the SILS data structure for the SIM/eSIM container that this SIM/eSIM profile is loaded into.

In some embodiments, the user account information 410 includes at least one of: a data field containing information of a time point of activation of the SIM/eSIM associated with first user device; a time point associated with an activation/inactivation/suspension of a user account associated with the first user device; a rate plan associated with the user account; a time point of a change of the rate plan, a time point of a repair of the first user device, a payment associated with the user account.

The SILS data structure 400 may be timely updated to record a status change of a user device during its life cycle. For example, a new instance corresponding to a new user device may be added to the SILS data structure 400. A new data field to an existing instance may be added, e.g., if a change of the user device is effectuated from a locked status to an unlocked status. An existing data field of an existing instance may be modified, e.g., to correct an error of the serialized inventory information if identified.

FIG. 5 is a flowchart diagram illustrating an example method 500 according to various embodiments. The illustrated flowchart represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the method is described with reference to the systems, architecture, and data structures shown in FIGS. 1-4.

In the example of FIG. 5, the method 500 includes operations 502, 504, 506, 508, 510, 512, and 514. At operation 502, a serialized inventory live status (SILS) data structure for a plurality of user devices is generated. The plurality of user devices includes a first user device and a SIM/eSIM associated with the first user device. The SILS data structure may be generated before the user devices are released from the inventory. The SILS data structure may also be timely updated to reflect a change of status for each of the user devices after they are released out of the inventory. The SILS data structure may record a live status of each of the user device throughout the entire life cycle thereof. As mentioned above, the SILS data structure may contain serialized inventory information regarding the user device, the SIM/eSIM container, the SIM/eSIM profile, and the user account associated with each of the user devices and the SIM/eSIM associated therewith.

At operation 504, the serialized inventory information regarding the plurality of user devices is managed, e.g., through use of the serialized inventory management system SIMS 220 of FIG. 3, according to the SILS data structure of the plurality of user devices. The serialized inventory information includes a plurality of instances respectively corresponding to the plurality of user devices. The plurality of instances includes a first instance, which includes first serialized inventory information regarding the first user device.

At operation 506, the first user device is tracked, e.g., through use of a DTUS of FIG. 3. In some embodiments, a wireless signal is transmitted from the DTUS to and received by the first user device. A responsive signal may be transmitted back from the user device to the DTUS. In some embodiments, multiple wireless signals may be transmitted between the first user device and the DTUS on separate occasions.

At operation 508, at least one current state of the first user device according to the first serialized inventory information regarding the first user device is obtained. At least one state of the first user device includes a first state indicating whether the first user device is locked or unlocked with respect to a specific carrier service. In some embodiments, a first wireless signal is transmitted to the first user device, the first wireless signal initiating an inquiry for status information regarding the first user device. A responsive wireless signal is generated by the user device and transmitted back to and received by the DTUS. The responsive wireless signal includes the status information related to one or more attributes of the first user device. The status information related to one or more attributes of the first user device is compared against the first serialized inventory information of the first user device. The at least one state of the first user device is obtained based on the comparison.

In some embodiments, the one or more attributes of the first user device include at least one of: a time point of sale associated with the first user device; a time point of activation of the SIM associated with first user device; a duration of time associated with an activation of a user account associated with the first user device; a rate plan associated with the user account; and a payment history associated with the user account, whether an account is current (or in default), whether the price of the device has been paid in full (or a remaining balance).

In some embodiments, the status information regarding the first user device transmitted to the DTUS is in a form of a status profile. The status profile may contain multiple data fields, each data field containing information related to one attribute of the first user device. The status information of the status profile is retrieved and further compared against the existing serialized inventory information stored of SILS data structure to determine the at least one current state of the first user device.

At operation 510, unlock eligibility of the first user device is determined, e.g., through use of a policy engine of FIG. 3, based on an existing device unlock policy of the wireless communication carrier (or network service provider). In some embodiments, the existing device unlock policy contains a set of pre-established rules specifying conditions needed to be satisfied for unlock. The set of pre-established rules may be accessed, e.g., via a rule database, by the policy engine. In some embodiments, the conditions may include at least one of the followings: the user device is SIM/eSIM unlock capable; the user device has not been reported as lost or stolen or otherwise flagged as ineligible to be unlocked; the device has been active on the associated subscriber account with a wireless communication carrier for a period of time, e.g., at least 2 months, at least 6 months, at least 12 months, or at least 24 months; the associated subscriber account is active and in good standing; and the user of the user device has no outstanding service bills.

Additional non-limiting examples of rules may consider a length of time that an account associated with a device has been activated, whether the price of the user device has been paid in full, whether an account is current (i.e., paid in full), etc. In some examples, a plurality of user devices is tracked, and unlock eligibility for each user device may vary depending on different pre-established rules. In such examples, the rule database may include one or more data entries and each data entry may correspond to a particular user device of the plurality of user devices. One or more pre-established rules may be associated with each data entry of the rule database. The one or more pre-established rules may be input by programmers and may be updated as appropriate.

In some embodiments, the existing device unlock policy may prescribe conditions for different types of unlock, such as temporary unlock, selective unlock, unlock specific to a geographical region, unlock for particular classes (e.g., military personnel), etc. Accordingly, the rule data base may include a plurality of pre-established rules corresponding to different types of unlock. An unlock eligibility verification for a specific type of unlock (e.g., a temporary unlock) may be performed according to the corresponding pre-established rule to determine if the conditions have been satisfied.

At operation 512, an unlock command is generated, e.g., through use of the unlock engine 350 of FIG. 3, upon unlock eligibility verification. The unlock command may be transmitted to the first user device via integrity-protected communication. The unlock command contains an unlock instruction, which includes unlock information. The unlock command is executable to effectuate a change of the first user device from being locked to being unlocked with respect to the carrier service.

The unlock command is received by the first user device, and the device unlock application of the user device may retrieve the unlock information contained in the unlock command. In some embodiments, the unlock command is further validated by the device unlock application of the user device to confirm that no error is included.

In some embodiments, a request is wirelessly transmitted to the first user device. The request notifies the user of the first user device that the first user device is eligible for unlock and seeks the user permission to automatically unlock the first user device. The request may be transmitted to the first user device prior to the transmission of the unlock command. Upon receipt of the user permission to unlock the first user device, the unlock command is generated and transmitted to the first user device. In some embodiments, a response from the first user device is received by the DTUS, the response confirming that the unlock command has been validated by the first user device. Upon validation of the unlock command, the first user device follows the instructions of the unlock command and effectuates a change of the first user device from a locked state to an unlocked state.

In some embodiments, the unlocked state corresponds to a permanently unlocked state, the permanently unlocked state enabling the first user device to access all previously unavailable services and previously unavailable functionalities without restriction. In some embodiments, the unlocked state corresponds to a temporarily unlocked state, the temporarily unlocked state enabling the first user device to access all previously unavailable services and previously unavailable functionalities until an occurrence of an event. In some embodiments, the event comprises at least one of: a lapse of a predetermined period of time; a determination that the device is outside of a predetermined geographic area; and a determination that the account is in default. The occurrence of an event can be detected by tracking the first user device and obtaining a current state or updated state of the first user device.

In some embodiments, the unlock command may further include unlock information indicating the permanency of the unlock (i.e., temporary vs. permanent), a geographical region of the unlock, the time and date that the unlock is performed, and/or so forth. In instances in which the unlock is temporary, the unlock information may indicate the duration of the temporary unlock, a start date and time for the temporary unlock, and/or an end date and time of the temporary unlock.

In some embodiments, the unlock command contains an instruction to disable the user device from performing a carrier verification check and permit the user device to initiate a normal boot up without restriction on a specific wireless communication carrier. In some embodiments, the unlock command contains an unlock PIN code, which may be used by the device unlock application to bypass the carrier verification check during each time of boot up. In some embodiments, the device is unlocked wirelessly and automatically by the unlock engine without user notice, user request submission, or third-party intervention. In some embodiments, the unlock command contains an instruction to modify a relationship between the first user device and the SIM associated with the first user device. In at least one example, the instruction may cause a modification to the relationship between the first user device and SIM so that the first user device does not look to the SIM for performing certain functionalities. As a result, the first user device may have access to previously unavailable network services and/or functionalities. Additionally, the instruction may cause a modification to the SIM profile information associated with the SIM so that the first user device may access additional and/or alternative services from additional and/or alternative network service providers.

At operation 514, the SILS data structure is modified to reflect the change of the first user device from being locked to being unlocked. In some embodiments, a new data field containing the unlock information is added to the instance corresponding to the first user device.

In some embodiments, a plurality of user devices may be handled simultaneously in a batch process, and each of the plurality of user devices is tacked and unlocked according to the method 500. In this way, the batch unlocking process need to rely on an unlock request for each individual user device, and therefore significant savings on time and labor costs may be achieved.

FIG. 6 is a schematic diagram illustrating an example of computer system 600. The computer system 600 is a simplified computer system (e.g., the computer system 330 of FIG. 3), and can be used to implement various embodiments described and illustrated herein.

A computer system 600 as illustrated in FIG. 6 may be incorporated into devices such as a portable electronic device, mobile phone, or other device as described herein. FIG. 6 provides a schematic illustration of one embodiment of a computer system 600 that can perform some or all of the steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors and/or one or more special-purpose processors such as digital signal processing chips, graphics acceleration processors, and/or the like; one or more input devices 615, which can include without limitation a mouse, a keyboard, a camera, and/or the like; and one or more output devices 620, which can include without limitation a display device, a printer, and/or the like.

The computer system 600 may further include and/or be in communication with one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset such as a Bluetooth™ device, an 602.11 device, a WiFi device, a WiMax device, cellular communication facilities, etc., and/or the like. The communications subsystem 630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 630. In other embodiments, a portable electronic device, e.g., the first electronic device, may be incorporated into the computer system 600, e.g., an electronic device as an input device 615. In some embodiments, the computer system 600 will further comprise a working memory 635, which can include a RAM or ROM device, as described above.

The computer system 600 also can include software elements, shown as being currently located within the working memory 635, including an operating system 660, device drivers, executable libraries, and/or other code, such as one or more application programs 665, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 6, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 625 described above. In some cases, the storage medium might be incorporated within a computer system, such as computer system 600. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 600 and/or might take the form of source and/or installable code, which, upon compilation and/or installation on the computer system 600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 600 to perform methods in accordance with various embodiments of the technology. According to a set of embodiments, some or all of the procedures of such methods are performed by the computer system 600 in response to processor 610 executing one or more sequences of one or more instructions, which might be incorporated into the operating system 660 and/or other code, such as an application program 665, contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 and/or components thereof generally will receive signals, and the bus 605 then might carry the signals and/or the data, instructions, etc. carried by the signals to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations or steps may be undertaken before, during, or after the above elements are considered.

What is claimed is:

1. A computer-implemented method, comprising:

establishing a serialized inventory database for an inventory of user devices before the user devices are released from the inventory, the inventory of user devices including a first user device, the serialized inventory database including a serialized inventory live status (SILS) data structure of the user devices;

managing serialized inventory information regarding the inventory of user devices according to the SILS data structure, and the serialized inventory live status data structure including a plurality of instances respectively corresponding to the user devices of the inventory, each one of the plurality of instances including a field for a subscriber identity module (SIM) associated with the corresponding user device;

transmitting a first wireless signal to each user device of the inventory, the first wireless signal initiating an inquiry for status information regarding the user device;

receiving a wireless response to the inquiry from the user device, the wireless response including the status information related to one or more attributes of the user device;

comparing, for each user device of the inventory, the status information related to one or more attributes of the user device against the serialized inventory information of the user device;

obtaining a current state of each user device based on the comparison, wherein the current state indicates whether the user device is locked or unlocked with respect to a carrier service;

determining, for each user device, if the user device is eligible for unlock according to a set of pre-established rules specifying conditions for the user device to be eligible for unlock; and in response to the current state of the first user device indicating the first user device is locked with respect to a carrier service and the determination that the first user device is eligible for carrier unlock, automatically transmitting an unlock command to the first user device without relying on a user request for unlocking, wherein the unlock command is executable to effectuate a change of the user device from being locked to being unlocked with respect to the carrier service.

2. The method according to claim 1, wherein the one or more attributes of each user device of the inventory include at least one of:
   a time point of sale associated with the user device;
   a time point of activation of the subscriber identity module associated with user device;
   a duration of time associated with an activation of a user account associated with the user device;
   a rate plan associated with the user account; and
   a payment history associated with the user account.

3. The method according to claim 1, wherein determining if each user device of the inventory is eligible for unlock according to the set of pre-established rules comprises:
   accessing, via a rule database, the set of pre-established rules; and
   performing an unlock eligibility verification according to the set of pre-established rules to determine if the conditions have been satisfied for the user device.

4. The method according to claim 1, further comprising:
   transmitting a second wireless signal to the first user device, the second wireless signal notifying a user of the first user device that the first user device is eligible for unlock and requesting a user permission to unlock the first user device; and
   receiving the user permission from the first user device.

5. The method according to claim 1, wherein the unlock command includes a first instruction to disable the first user device from performing a carrier verification check.

6. The method according to claim 1, wherein the unlock command includes a second instruction to modify a relationship between the first user device and the subscriber identity module associated with the first user device.

7. The method according to claim 1, further comprising:
   transmitting a third wireless signal to the first user device, the third wireless signal notifying a user of the first user device that the first user device has been unlocked.

8. The method according to claim 1, further comprising:
   modifying the SILS data structure to reflect the change of the first user device from being locked to being unlocked.

9. The method according to claim 1, wherein the unlock command includes a unlock code executable by the first user device to bypass a carrier verification check during each time of boot up.

10. A computerized system comprising:
   one or more electronic processors;
   a machine-readable storage medium in electronic communication with the one or more electronic processors; and
   instructions stored in the machine-readable storage medium and executable by the one or more electronic processors to cause the system to:
      establish a serialized inventory database for an inventory of user devices, the inventory of user devices including a first user device before the user devices are released from the inventory, the serialized inventory database including a serialized inventory live status (SILS) data structure of the user devices;
      manage serialized inventory information regarding the inventory of user devices according to the SILS data structure and the serialized inventory live status data structure including a plurality of instances respectively corresponding to the user devices of the inventory, each one of the plurality of instances including a field for a subscriber identity module (SIM) associated with the corresponding user device;
      transmit a first wireless signal to each user device of the inventory, the first wireless signal initiating an inquiry for status information regarding the user device;
      receive a wireless response to the inquiry from the user device, the wireless response including the status information related to one or more attributes of the user device;
      compare, for each user device of the inventory, the status information related to one or more attributes of the user device against the serialized inventory information of the user device;
      obtain a current state of each user device based on the comparison, wherein the current state indicates whether the user device is locked or unlocked with respect to a carrier service;
      determine, for each user device, if the user device is eligible for unlock according to a set of pre-established rules specifying conditions for the user device to be eligible for unlock; and
      in response to the current state of the first user device indicating the first user device is locked with respect to a carrier service and the determination that the first user device is eligible for carrier unlock, automatically transmit an unlock command to the first user device without relying on a user request for unlocking, wherein the unlock command is executable to effectuate a change of the user device from being locked to being unlocked with respect to the carrier service.

11. The computerized system according to claim 10, wherein the one or more attributes of each user device of the inventory include at least one of:
   a time point of sale associated with the first user device;
   a time point of activation of the subscriber identity module associated with first user device;
   a duration of time associated with an activation of a user account associated with the first user device;
   a rate plan associated with the user account; and
   a payment history associated with the user account.

12. The computerized system according to claim 10, wherein the one or more processors are further instructed to cause the system to:
   access, via a rule database, the set of pre-established rules for each user device of the inventory; and
   perform an unlock eligibility verification according to the set of pre-established rules to determine if the conditions have been satisfied for the user device.

13. The computerized system according to claim 10, wherein the one or more processors are further instructed to cause the system to:
   transmit a second wireless signal to the first user device, the second wireless signal notifying a user of the first user device that the first user device is eligible for unlock and requesting a user permission to unlock the first user device; and receive the user permission from the first user device.

14. The computerized system according to claim 10, wherein the unlock command includes a first instruction to disable the first user device from performing a carrier verification check.

15. The computerized system according to claim 10, wherein the unlock command includes a second instruction to modify a relationship between the first user device and the subscriber identity module associated with the first user device.

16. The computerized system according to claim 10, wherein the one or more processors are further instructed to cause the system to transmit a third wireless signal to the first user device, the third wireless signal notifying a user of the first user device that the first user device has been unlocked.

17. A non-transitory machine-readable storage medium encoded with instructions, the instructions executable to cause one or more processors of a computerized system to perform one or more operations of a method, the method comprising:

establishing a serialized inventory database for an inventory of user devices, the inventory of user devices including a first user device before the user devices are released from the inventory, the serialized inventory database including a serialized inventory live status (SILS) data structure of the user devices;

managing serialized inventory information regarding the inventory of user devices according to the SILS data structure, and the serialized inventory live status data structure including a plurality of instances respectively corresponding to the user devices of the inventory, each one of the plurality of instances including a field for a subscriber identity module (SIM) associated with the corresponding user device;

transmitting a first wireless signal to each user device of the inventory, the first wireless signal initiating an inquiry for status information regarding the user device;

receiving a wireless response to the inquiry from the user device, the wireless response including the status information related to one or more attributes of the user device;

comparing, for each user device of the inventory, the status information related to one or more attributes of the user device against the serialized inventory information of the user device;

obtaining a current state of each user device based on the comparison, wherein the current state indicates whether the user device is locked or unlocked with respect to a carrier service;

determining, for each user device, if the user device is eligible for unlock according to a set of pre-established rules specifying conditions for the user device to be eligible for unlock; and in response to the current state of the first user device indicating the first user device is locked with respect to a carrier service and the determination that the first user device is eligible for carrier unlock, automatically transmitting an unlock command to the first user device without relying on a user request for unlocking, wherein the unlock command is executable to effectuate a change of the user device from being locked to being unlocked with respect to the carrier service.

18. The non-transitory machine-readable storage medium according to claim 17, wherein the method further comprises:

accessing, via a rule database, the set of pre-established rules for each user device of the inventory; and performing an unlock eligibility verification according to the set of pre-established rules to determine if the conditions have been satisfied for the user device.

19. The non-transitory machine-readable storage medium according to claim 17, wherein the method further comprises:

transmitting a second wireless signal to the first user device, the second wireless signal notifying a user of the first user device that the first user device is eligible for unlock and requesting a user permission to unlock the first user device; and receiving the user permission from the first user device.

* * * * *